United States Patent [19]

Kubo et al.

[11] 4,355,393

[45] Oct. 19, 1982

[54] MICROCOMPUTER HAVING A RAM FOR STORING PARITY BITS

[75] Inventors: Kazuyuki Kubo; Shigenobu Katagiri, both of Katsuta, Japan

[73] Assignee: Hitachi Koki Company, Limited, Tokyo, Japan

[21] Appl. No.: 116,865

[22] Filed: Jan. 30, 1980

[30] Foreign Application Priority Data

Jan. 31, 1979 [JP] Japan .................................. 54-10859

[51] Int. Cl.³ ............................................ G06F 11/10
[52] U.S. Cl. ...................................... 371/51; 364/200
[58] Field of Search ............... 364/200 MS File, 900; 371/49, 51

[56] References Cited

U.S. PATENT DOCUMENTS

3,531,631 9/1970 Burgess ................................. 371/51

FOREIGN PATENT DOCUMENTS

2906789 3/1978 Fed. Rep. of Germany ........ 371/51

OTHER PUBLICATIONS

*Parity Generation at ROS Output,* Gladstein and Love, IBM Technical Disclosure, vol. 21, No. 1, p. 255, Jun. 1978.

*Parity Checking of ROS Input Word,* Gladstein and Love, IBM Technical Disclosure, vol. 21, No. 1, p. 256, Jun. 1978.

*Primary Examiner*—Gareth D. Shaw
*Assistant Examiner*—Stephen A. Soffen
*Attorney, Agent, or Firm*—Lowe, King, Price & Becker

[57] ABSTRACT

A microcomputer which controls a device or apparatus in accordance with a control program prestored in a Read Only Memory included in the microcomputer, further comprises a Random Access Memory for storing parity bits of the control program. The data indicative of the control program prestored in the Read Only Memory are read out in sequence and are fed to a central processing unit of the microcomputer so that parity bits of the prestored data are produced and then stored in the Random Access Memory. The parity bits stored in the Random Access Memory are used to check whether the prestored data are correct or not.

9 Claims, 3 Drawing Figures

MICROCOMPUTER HAVING A RAM FOR STORING PARITY BITS

FIELD OF THE INVENTION

This invention generally relates to a microcomputer. More particularly, the present invention relates to a memory or storage device of a microcomputer, which memory device is used to store parity bits of the control program.

BACKGROUND OF THE INVENTION

Recently, microcomputers have been widely used for controlling various devices and apparatus. If a system to be controlled by a microcomputer is relatively small, Read Only Memories (ROMs) are often used as program memories for the microcomputer. When a ROM is used as a program memory of a microcomputer, a series of processes, such as a process from a program assembly to a program writing into a ROM, is executed relatively easily by using a development tool on the market.

However, none of the development tools on the market produces parity bits with respect to a control program prestored in the ROM. Accordingly, if it is desired to add parity bits to the ROM program memory, the software of the development tool must be changed. Furthermore, if the program is to be changed due to a bug which arises during debugging the program of the microcomputer, or due to a change of the application requirement of the microcomputer, the parity bits corresponding to the control program also must be altered.

SUMMARY OF THE INVENTION

The present invention has been achieved in order to eliminate the above mentioned disadvantages and drawbacks inherent in the conventional microcomputer systems.

It is, therefore, a primary object of the present invention to provide a new and useful microcomputer in which parity bits corresponding to the prestored program data are readily derived.

Another object of the present invention is to provide a new and useful microcomputer in which parity bits of a control program are automatically derived in response to a power switch of the microcomputer being turned on, and then the derived parity bits are stored in a Random Access Memory.

A further object of the present invention is to provide a new and useful microcomputer in which parity bits stored in the Random Access Memory are read out to check prestored data of the control program while the program controls a device or apparatus which is being controlled by the microcomputer.

To carry out the above objects a central processing unit of a microcomputer is responsive to each datum of a control program prestored in a Read Only Memory to derive parity bits of the control program, and then the parity bits are stored in Random Access Memory which is additionally provided. Namely, if a microcomputer is equipped with a Random Access memory in the same manner as in most of conventional microcomputers, a second or auxiliary Random Access Memory is employed to store the above mentioned parity bits.

BRIEF DESCRIPTION OF THE DRAWINGS

These and other objects and features of the present invention will become more readily apparent from the following description of the embodiment taken in conjunction with the accompanying drawings in which.

DETAILED DESCRIPTION OF THE PREFERRED EMBODIMENT

Figure 1:
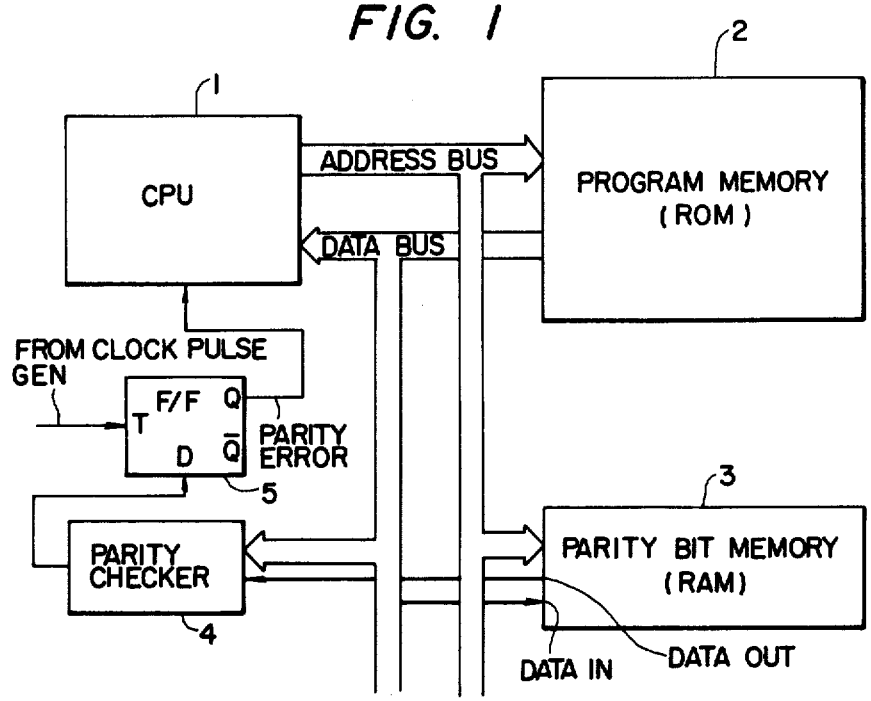
FIG. 1 is a schematic block diagram of a microcomputer according to the present invention.

Reference is now made to FIG. 1, a schematic block diagram of the microcomputer according to the present invention. The microcomputer comprises a CPU (central processing unit) 1, a ROM (Read Only Memory) 2 which functions as a program memory, and a RAM (Random Access Memory) which functions as a program and data memory. This RAM, referred to herein as a first RAM, and is not shown in FIG. 1. The microcomputer according to the present invention further comprises a parity checking system which includes a second RAM 3, a parity checker 4 and a flip-flop 5. The second or auxiliary RAM 3 functions as a parity bit memory as described in detail infra.

Figure 2:
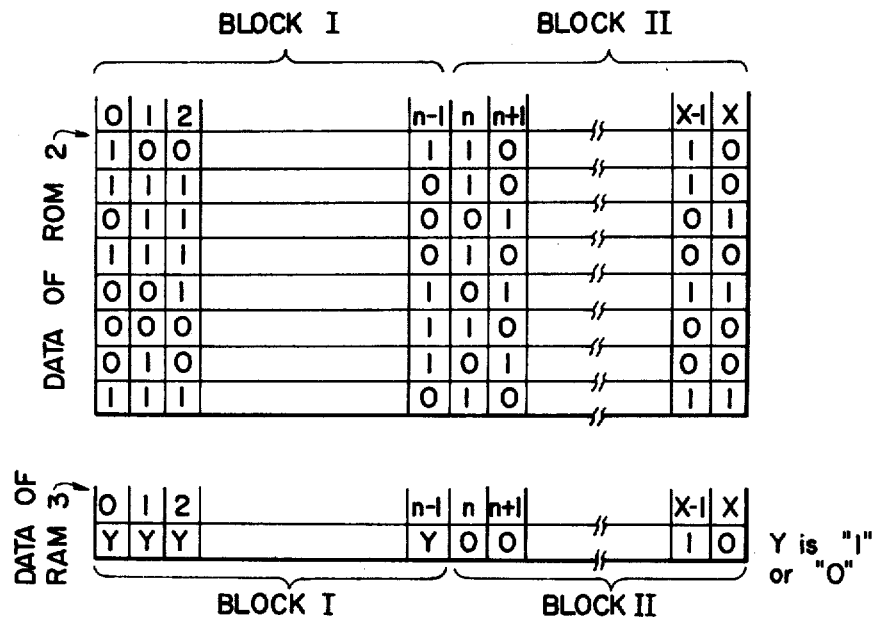
FIG. 2 is a table of the logic levels of the bits stored in the Read Only Memory and the Random Access Memory shown in FIG. 1.

The operation of the microcomputer is described with reference to a logic level table of FIG. 2 and a flow chart of FIG. 3. The ROM program memory 2 has a plurality of addresses, namely, from address "0" to address "X", as indicated by the top line in the table of FIG. 2. The plurality of addresses from "0" to "X" are divided into two portions respectively designated as block I and block II. The block I consists of addresses from "0" to "n−1", while the other block II consists of addresses from "n" to "X" as shown in FIG. 2. In each address of the two blocks I and II, a word, which is set of bits, is stored. In this embodiment, each word includes eight bits, in FIG. 2, the bits in each word for a particular address are indicated in the column beneath the address indicted by the top line, e.g., the bits of the word in address 2 are 01111001. The block I stores a program for an operation that causes parity bits to be derived, while the block II is used to store a normal program for the control of a device or apparatus which is being controlled by the computer. The eight bits stored in each address of the program memory 2 are delivered to the CPU 1, which responds to them and determines the parity bit of each word. In other words, the CPU 1 detects whether the number of logic ones of each address is even or odd. The result of the parity bit detection is supplied by CPU 1 to the second RAM 3, where it stored. RAM 3 has an address corresponding to each address of the ROM 2. The parity bit for each address of ROM 2 is stored at the corresponding address of second RAM 3. The logic levels of the bits stored in the addresses of RAM 3, which functions as a parity bit memory, are shown below the logic level table in FIG. 2, wherein the addresses 0, 1, 2 . . . X of RAM 3 corresponding with the addresses 1, 2 . . . X of ROM 2 are in the same column. The parity bits in RAM 3 are indicated by the last line in the table of FIG. 2.

As is well known, either an even parity system or an odd parity system can be selected for a parity check. In this embodiment, the odd parity system is adopted, and therefore, the following description is made on the condition that the odd parity system is used. Thereby, the parity bit (9th bit) derived in response to the eight data bits of a word causes the total number of binary one bits in the nine bit word to be odd, In response to a power switch (not shown) of the microcomputer being turned on, the CPU 1 begins to execute the program sequence, starting from address "0". Accordingly, the operational instructions represented by the bits of the addresses from "0" to "n−1", i.e., the program data of the block I, are read out in sequence to determine the parity of the remaining words, i.e., words n to X. In response to the data of block I being read out, the data at the addresses "n" through X are read out and thus the data of the addresses "n" and X are transmitted to the CPU 1. The number of logic one data bits in the word at address "n" is detected by CPU 1 as being either even or odd. The CPU 1 produces a logic "0" parity bit if the number of the logic one data bits of the word is odd; on the other hand, CPU 1 produces a logic "1" parity bit if the number of the logic one data bits of the word is even. The parity bit logic output of the CPU 1 for data word n is written into the address "n" of RAM 3 in turn. In the example of the logic levels of FIG. 2, the number of logic ones included in the word stored in the address "n" of the program memory 2 is five. Namely, the number of logic ones is odd, and therefore, a logic "0" is stored in the corresponding address "n" of the second RAM 3. In this way, the parity bits of the remaining addresses from "n" to "X" are produced by the CPU 1 and the parity bits are written into the corresponding addresses from "n" to "X" of the parity bit memory, i.e. the second RAM 3, in a sequence.

After CPU 1 derives and RAM 3 stores the parity bits of the program data of the block II, the CPU 1 executes the control program prestored in the block II of the program memory 2. To this end, each datum stored in each address of the control program stored in block II of program memory 2 is read out by the CPU 1. When a datum stored in a specific address of the block II is read out, RAM parity bit memory 3 is simultaneously read out, and subsequently the program datum of the specific address and the parity bit of the datum are respectively fed to the parity checker 4. The parity checker 4 detects whether the number of logic ones of each word is even or odd as indicated by the parity bit. As a result, if a parity error occurs, the parity checker 4 produces a logic "1" output signal. The output terminal of the parity checker 4 is connected to a D input terminal of D type flip-flop 5. The D type flip-flop 5 is also responsive to clock pulses applied from a suitable clock pulse generator (not shown), whereby, the D type flip-flop 5 is set in receipt of a clock pulse if a logic "1" output signal of the parity checker 4 has been previously fed to the D type flip-flop 5. In other words, the D type flip-flop 5 produces an output signal designated as "PARITY ERROR", in turn applied to the CPU 1 to signal that a parity error has occurred in the control program data prestored in the program memory 2.

In this way, parity bits are produced and then parity check is performed. However, since no parity bits are written in the address "0" to the address "n-1" which are included in the block I, of the parity bit memory 3, parity errors may occur during the execution of the program of the block I of the program memory 2. The occurrence of such parity errors is prevented by not producing clock pulses as long as the CPU 1 executes the program of the block I of the program memory 2.

During an interval while CPU 1 executes the program of the block I, it cannot be ascertained whether the parity bits are produced correctly or not inasmuch as the parity check is not being performed at this time. However, if a parity bit has been erroneously produced, a parity error would occcur as the CPU 1 executes the control program of the block II of the program memory 2. Consequently, no problem arises although it is not ascertained whether parity bits have been correctly produced or not.

Figure 3:
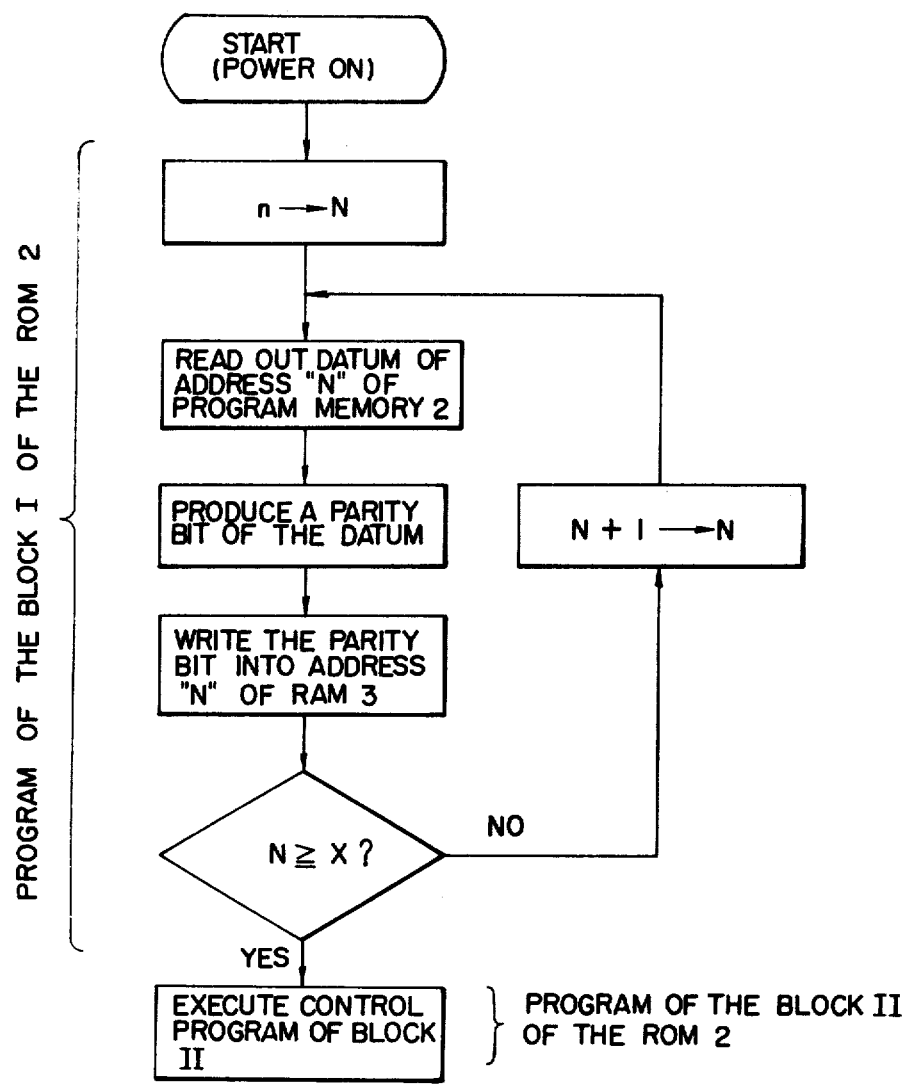
FIG. 3 is a flow chart of the operation of the microcomputer of FIG. 1 in connection with the production and storage of the parity bits.

FIG. 3 is a flow chart of the operating sequence for the production of the parity bits. This sequence occurs in response to CPU 1 addressing the program stored at addresses 0 through n, i.e., block I, in ROM 2. Thus, the flow chart of FIG. 3 is the program of instructions for CPU 1 that causes the CPU to read data from addresses n through X of ROM 2, to cause the CPU to direct calculation of the parity bit for addresses n through X, and to cause the CPU to feed the calculated parity bit for addresses n through X to corresponding addresses in RAM 3. As the power switch of the microcomputer is turned on, the microcomputer starts operating in accordance with the prestored program in ROM 2. Namely, as described supra, the program starts from the address "0" of the first block I. In the flow chart, a reference "N" is a general term indicative of one of the addresses from "n" to "X". At the beginning of the operational sequence the address "N" is equal to the first address "n" at second block II. Accordingly, the word of the address "n" is read out of ROM 2 and transferred to a register included in the CPU 1 so that the CPU 1 is capable of operating and thus producing a parity bit for data set of the bits of the word which has been read out from the address "n" of ROM 2. The parity bit produced by the CPU 1 is then written into a predetermined address of the second RAM 33. This predetermined address corresponds to an address "n" of the second RAM 3 as shown in FIG. 2. Therefore, an address where a parity bit is written is expressed in terms of "N".

After the parity bit of the word from the address "n" is written into the address "n" of the second RAM 3, the number of the address "N", i.e. "n" at this time, is compared with the number of the last address "X". In this comparison step, if the number of the address "N" is equal to or greater than the number of the last address "X", the answer of the step is YES, while on the other hand, if the number of the address "N" is smaller than the number of the address "X", the answer of the same step is NO. In case that the answer of this step is NO, the number of the address "N" is increased by one. Assuming that the parity bit of the word of the address "n" has been stored in the corresponding address "n" of the second RAM 3, the number of the address "N" equals "n", and therefore, "n" is obviously smaller than "X" causing the comparison step to make the answer of NO. Following this comparison step the address "N" is replaced by the next address "n+1". With this operation, the datum prestored in the next address "n+1" is then read out and thus the parity of address "n+1" is detected in the same manner as described in the above.

The above described operation for the production and storage of the parity bits is repeated until the answer of the comparison step becomes YES. In other words, parity bits are produced in a sequence as to the addresses from "n" to "X", and the produced parity bits are stored in the corresponding addresses of the second RAM 3 in turn. After all of the parity bits are produced and stored in the second RAM 3, the answer of the comparison step becomes YES so that the normal control operation in accordance with the control program prestored in the block II is initiated.

In the above described embodiment, although it has been set forth that the operation and the determination of the parity bits are performed by the CPU 1, a customary parity bit generator may be utilized in place of the CPU 1 to produce parity bits. The number of bits which constitute a word stored in each address is not limited to eight. Namely, the technique according to the present invention may be adapted to other types of storage devices for various number of bits, such as four, sixteen and so on.

It will be understood by those skilled in the art that various modifications and variations may be made without departing from the spirit of the present invention.

What is claimed is:

1. A microcomputer including a central processing unit and read only memory for storing a control program having instructions for said central processing unit, wherein the improvement comprises:
   (a) means responsive to the microcomputer being supplied with power for deriving parity bits for words of said control program;
   (b) a random access memory means having a segment responsive to the parity bit deriving means for storing only said derived parity bits; and
   (c) means for parity checking each instruction word of said control program stored in said read only memory in combination with the parity bit for the corresponding word as stored in said random access memory.

2. A microcomputer as claimed in claim 1 wherein said parity checking means includes a parity checker responsive to program data prestored in said read only memory and to the parity bits stored in said random access memory for detecting whether each of said program words has the correct parity, and a D type flip-flop responsive to an output signal of said parity checker and clock pulses derived from a clock pulse generator, said D type flip-flop producing an output signal indicative of a parity error in response to said output signal of said parity checker and to said clock pulse.

3. A method of deriving and storing parity bits of a control program prestored in a read only memory included in a microcomputer having a central processing unit arranged to operate in accordance with said control program, comprising the steps of:
   (a) reading out a datum prestored in a predetermined address of said read only memory when said microcomputer is supplied with power;
   (b) operating on said read out datum by said central processing unit to detect the parity of said datum and thus producing a parity bit associated with said datum;
   (c) storing said detected parity bit in a predetermined address of a random access memory provided for storing only parity bits of said control program; and
   (d) repeating the above steps until parity bits corresponding to all of the control program data prestored in said read only memory are derived and stored in said random access memory.

4. Apparatus for deriving and storing parity bits of a control program for a microcomputer comprising central processing unit means having an address output and a data input; a read only memory including memory blocks I and II, an address input and a data output; a random access memory having an address input, a data input and a data output; an address bus interconnecting the address output and the address inputs; a data but interconnecting the data inputs and data outputs; memory blocks I and II respectively including multi-bit words at addresses d through (k−1) and k through x, where d, k and x are respectively progressively increasing integers, the words at addresses d through x, as stored in blocks I and II, not including a parity bit, the words at addresses d through (k−1) being sequential instructions for: (a) controlling read out of the multi-bit words at addresses k through x to the central processing unit means, (b) commanding the central processing unit means to derive a parity bit for each of the multi-bit words at addresses k through x while the central processing unit means is responsive to multi-bit words at addresses k through x from the read only memory, (c) commanding the central processing unit means to supply the derived parity bit for each of the multi-bit words at addresses k through x to correponding addresses of the random access memory, each of the words at addresses k through x for instruction (a) being coupled from the read only memory to the central processing unit means via the data bus in response to address signals coupled from the central processing unit means to the read only memory via the address bus, each derived parity bit for each of the words at addresses k through x being supplied to the corresponding addresses of the random access memory via the data bus in response to address signals coupled from the central processing unit means to the random access memory via the address bus, the central processing unit being activated to supply an address signal for address d to the address bus in response to the occurrence of a predetermined event.

5. The apparatus of claim 4 further comprising a parity checker for enabling the data at words k through x to be checked, the parity checker being responsive to the words read out from the read only memory to the data bus and the parity bit read out from the corresponding addresses of the random access memory to the data bus in response to addresses k through x being supplied by the central processing unit means to the address bus, whereby the parity checker derives an error indicating signal in response to the words read out from the addresses k through x of the read only memory as combined with the corresponding parity bits from the corresponding random access memory addresses when a parity error occurs in a read out word.

6. A method of enabling prestored data of a control program for a microcomputer to be checked, the microcomputer including: central processing means, a read only memory including multi-bit words at addresses k through x, the words at addresses k through x, as stored in the read only memory, not including a parity bit, the method comprising: reading out the multi-bit words at addresses k through x of the read only memory to the central processing unit means, deriving a parity bit for each of the multi-bit words at addresses k through x in the central processing unit means, and supplying the derived parity bit for each of the multi-bit words at addresses k through x from the cental processing unit means to corresponding addresses of the random access memory, each of the words at addresses k through x being a separate datum item, the separate items together forming the prestored data to be checked, and checking the parity of the words read out from the read only memory combined with the parity bits read out from the corresponding addresses of the random access memory, whereby the parity check indicates an error for words k through x in response to the words read out from addresses k through x of the read only memory as combined with the corresponding parity bits from the corresponding random access memory addresses when a parity error occurs in a read out word.

7. A method of enabling prestored data of a control program for a microcomputer to be checked, the microcomputer including central processing unit means having an address output and a data input; a read only memory including memory blocks I and II, an address input and a data output; a random access memory having an address input, a data input and a data output; an address bus interconnecting the address output and the address inputs; a data bus interconnecting the data inputs and data outputs; memory blocks I and II respectively including multi-bit words at addresses d through (k−1) and k through x, where d, k and x are respectively progressively increasing integers, the words at addresses d through x, as stored in blocks I and II, not including a parity bit, the words at addresses d through (k−1) being sequential instructions for: (a) controlling read out of the multi-bit words at addresses k through x to the central processing unit means, (b) commanding the central processing unit means to derive a parity bit for each of the multi-bit words at addresses k through x while the central processing unit means is responsive to addresses k through x from the read only memory, (c) commanding the central processing unit means to supply the derived parity bit for each of the multi-bit words at addresses k through x to corresponding addresses of the random access memory, each of the words at addresses k through x being a separate datum item, the separate items together forming the prestored data to be checked, the method comprising activating the central processing unit means to supply an address signal for address d to the address bus in response to the occurrence of a predetermined event, and thereafter supplying address signals for addresses (d+1) through x in sequence to the address bus, supplying the multi-bit words at addresses k through x to the central processing unit means in response to the central processing unit means being sequenced from address d to address (k−1), in the central processing unit means deriving parity bits for the words at addresses k through x in response to the words at addresses k through x being coupled to the central processing unit means under the control of the words at addresses d through (k−1), supplying the derived parity bits for the words at addresses k through x from the central processing unit means to addresses in the random access memory corresponding to addressses k through x, sequentially checking the parity of each word at addresses k through x of the read only memory as combined with the parity bits stored in the random access memory corresponding addresses in response to the central processing unit means being sequenced from address k through address x.

8. Apparatus for enabling prestored data of a control program for a microcomputer to be checked, comprising central processing unit means, a read only memory including multi-bit words at addresses k through x, the words at addresses k through x, as stored in the read only memory, not including a parity bit, a random access memory, means for: (a) controlling read out of the multi-bit words at addresses k through x to the central processing unit means, (b) commanding the central processing unit means to derive a parity bit for each of the multi-bit words at addresses k through x while the central processing unit means is responsive to multi-bit words at addresses k through x from the read only memory, (c) commanding the central processing unit means to supply the derived parity bit for each of the multi-bit words at addresses k through x to corresponding addresses of the random access memory, each of the words at addresses k through x being a separate datum item, the separate items together forming the prestored data to be checked; a parity checker; and means for coupling the words read out from addresses k through x of the read only memory and the parity bits read out from the corresponding addresses of the random access memory to the parity checker, whereby the parity checker derives an error indicating signal in response to the words read out from addresses k through x of the read only memory as combined with the corresponding parity bits from the corresponding random access memory addresses when a parity error ocurs in a read out word.

9. A method of deriving and storing parity bits of a control program for a microcomputer, the microcomputer including: central processing unit means, a read only memory including multi-bit words at addresses k through x, the words at addresses k through x, as stored in the read only memory not including a parity bit, and a random access memory; the method comprising: reading out the multi-bit words at addresses k through x of the read only memory to the central processing unit means, deriving a parity bit for each of the multi-bit words at addresses k through x in the central processing unit means, and supplying the derived parity bit for each of the multi-bit words at addresses k through x from the central processing unit means to corresponding addresses of the random access memory.

* * * * *